United States Patent

Bailey et al.

[11] Patent Number: 5,850,184
[45] Date of Patent: Dec. 15, 1998

[54] ULTRASONIC TOOL CONFIRMATION SENSOR

[75] Inventors: Trevor Bailey, Dundas; Doug Renton, Holstein; Richard Teltz, Hamilton; M. Elbestawi, Oakville; Aly Shawky, Hamilton; Stephen Veldhuis, Dundas; Garfield R. Lunn, Amherstburg, all of Canada

[73] Assignee: Cobra Machine Tool Co., Inc., Canada

[21] Appl. No.: 881,812

[22] Filed: Jun. 25, 1997

[51] Int. Cl.⁶ .................................................. G08B 21/00
[52] U.S. Cl. .................... 340/680; 340/540; 340/679; 340/686; 340/687; 367/93; 367/94; 408/8; 408/16; 408/56
[58] Field of Search ........................ 340/540, 679, 340/680, 686, 687, 600; 367/13, 93, 94, 95, 96, 97; 408/6, 8, 11, 16, 86, 52, 59, 60, 61; 409/131; 73/597, 628, 596; 364/551.02

[56] References Cited

U.S. PATENT DOCUMENTS

| | | | |
|---|---|---|---|
| 3,603,203 | 9/1971 | Rhodes | 409/232 |
| 3,627,437 | 12/1971 | Smith | 408/16 |
| 3,963,364 | 6/1976 | Lemelson | 408/8 |
| 4,026,143 | 5/1977 | Holland | 73/596 |
| 4,504,824 | 3/1985 | Mello | 340/680 |
| 4,593,277 | 6/1986 | Langan | 50/680 |
| 4,864,714 | 9/1989 | Von Haas et al. | 483/1 |
| 5,036,706 | 8/1991 | Gnuechtel et al. | 73/597 |
| 5,090,847 | 2/1992 | Gelston, II | 408/16 |
| 5,602,533 | 2/1997 | Boverio | 340/686 |
| 5,652,388 | 7/1997 | Callan et al. | 73/628 |

OTHER PUBLICATIONS

A.M. Shawky and M.A. Elbestawl, "Development of an Ultrasonic Sensor for In–Process Measurement of Workpiece Diameter in Bar Turning" Department of Mechanical Engineering, McMaster University 1994.

Various documents from the Websites of Senix Corporation; Krautkraemer GmbH Co.; Inspection Research & Technologies; UE Systems, Inc.

*Primary Examiner*—Jeffery A. Hofsass
*Assistant Examiner*—Benjamin C. Lee
*Attorney, Agent, or Firm*—Howard & Howard

[57] ABSTRACT

A tool detection system combines a sensor nozzle with an ultrasonic transducer capable of propagating and detecting ultrasonic waves. A wave is propagated in a coolant fluid stream directed at a tool to be monitored. A control unit powers the ultrasonic transducer and contains circuits for analyzing the ultrasonic waves detected by the ultrasonic transducer. The control compares the actual time between the propagation of an ultrasonic wave and detection of an echo wave reflected from the tool, to an expected time. An alarm is generated when the tool is not present as indicated by the actual time exceeding the expected time. An alarm signal generated by the alarm generator either stops the tool or signals an operator that the tool is absent.

14 Claims, 1 Drawing Sheet

5,850,184

ULTRASONIC TOOL CONFIRMATION SENSOR

BACKGROUND OF THE INVENTION

The present invention relates generally to a method and a system for detecting the presence of a tool in a cutting machine.

Mass production assembly lines and unmanned machining assembly lines require simple, reliable, and automatic tool breakage detection systems. The ability to detect tool breakage is important to produce high quality parts at a high rate of speed. The breakage of a cutting tool, which is a relatively frequent occurrence, can be very disruptive to an assembly line if not detected immediately.

Most current tool breakage detection systems rely on some form of contact with the tool or require complex equipment. In addition, many of these detection systems are sensitive to debris from the cutting operation and thus require a clean operating environment. A clean environment can be difficult to maintain on an assembly line.

Systems are also known which use air pressure changes or microwaves to indicate the presence of the tool. These systems have been somewhat unreliable and not as robust as desirable.

Ultrasonic wave transmitters are known and used in combination with a fluid carrier medium to detect distances. These systems have not been used to detect the presence or absence of a tool.

SUMMARY OF THE INVENTION

The invention includes a method of detecting the presence of a tool. An ultrasonic wave is directed against the tool. Preferably, the wave is propagated in a stream of fluid. In essence the fluid provides a carrier medium to ensure proper direction for the wave. Also, one can visually ensure the fluid, and hence the wave, is directed at the tool. Ultrasonic waves are more reliable for the detection purposes than the prior art approaches.

An echo wave of the ultrasonic wave reflected from the tool is detected. An alarm signal is generated in response to an absence of the echo wave within predetermined limits.

In a preferred embodiment, the fluid stream can be the known cleaning or coolant fluid which is directed at the tool during cutting. Thus, no additional fluid is required.

The invention further comprises a system for detecting the presence of a tool. A sensor nozzle directs a stream of fluid over a first distance to impinge against a tool being monitored. A generator in the nozzle propagates an ultrasonic wave in the stream of fluid over the first distance. A detector in the nozzle detects an echo wave from the ultrasonic wave, reflected from the tool. An alarm generator generates an alarm signal in response to an absence of the echo wave within a predetermined time.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
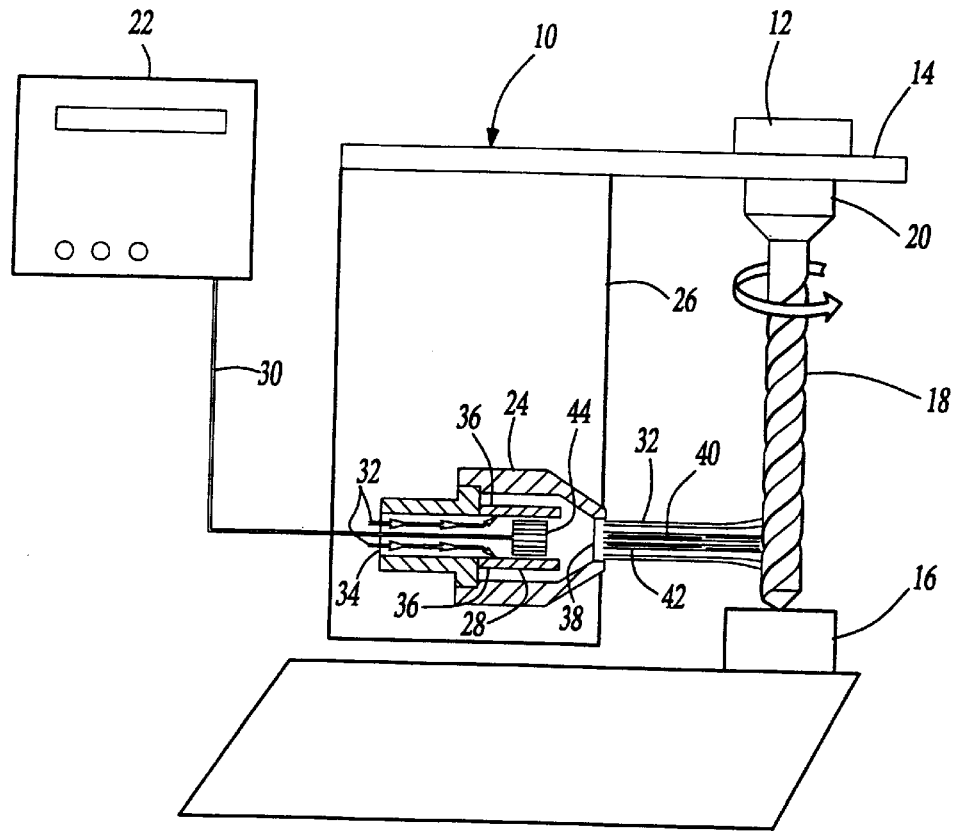
FIG. 1 is a schematic view illustrating a tool detection system.

Referring to FIG. 1, a tool detection system 10 is associated with tool drive unit 12 mounted on a tool and a sensor carriage 14. Carriage 14 moves in both a horizontal and a vertical direction to enable it to be positioned over a workpiece 16 and upon sufficient vertical downward movement to drive a tool 18 into the workpiece 16. A shaft (not shown) from the tool drive unit 12 engages a tool chuck 20 which, in conjunction with the tool drive unit 12, rotates the tool 18. A control unit 22 is also mounted adjacent carriage 14. A sensor nozzle 24 is attached to move with carriage 14, as shown schematically at 26. The tool 18 and carriage 14 may move vertically relate to nozzle 24.

An ultrasonic transducer 28 is mounted within the sensor nozzle 24, and an electric cable 30 couples the control unit 22 to the ultrasonic transducer 28. A stream of fluid 32 enters the sensor nozzle 24 through a fluid inlet 34, passes out through a set of fluid holes 36, and exits the sensor nozzle 24 through a sensor nozzle outlet 38 in a stream of fluid 32 to impinge on the tool 18. The fluid stream 32 has a laminar flow and may be the known coolant or cleaning fluid which is directed at the tool 18 as it cuts the workpiece 16. An ultrasonic wave 40 is generated by the ultrasonic transducer 28 and exits the sensor nozzle 24. Wave 40 is propagated through the stream of fluid 32 and directed at tool 18. An echo wave 42 is reflected from the tool 18 back through the stream of fluid 32 into the sensor nozzle 24 and is detected by the ultrasonic transducer 28. Thus, the ultrasonic transducer 28 functions both as a generator of the ultrasonic wave 40 and a detector of the echo wave 42. Such transducers are known in the art and its structure forms no portion of this invention. A signal from the detected echo wave 42 is sent to the control unit 22 via the electric cable 30.

The transducer is provided by a piezoelectric element 44 mounted in the ultrasonic transducer 28. The diameter of the piezoelectric element 44 is similar in size to the diameter of the sensor nozzle outlet 38.

Figure 2:
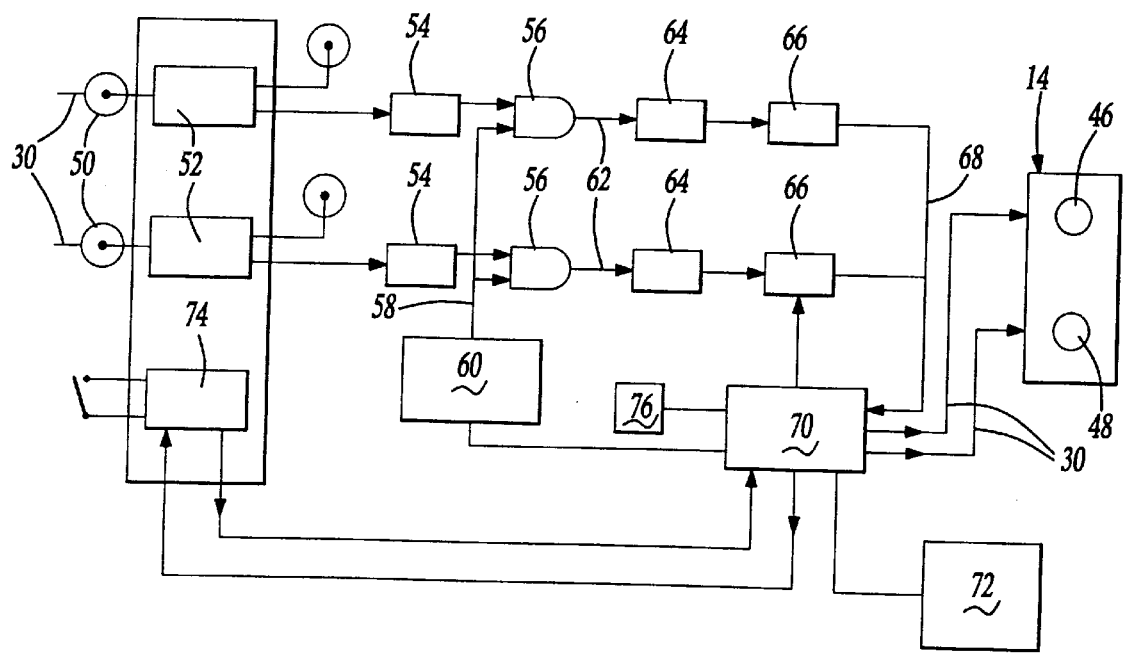
FIG. 2 is a schematic diagram of a control unit circuit.

Referring to FIG. 2, a schematic diagram of the control unit 22 connected to a pair of tools 46 and 48, is shown. Since the circuit for each tool is identical and contains identical elements only the circuit for tool 48 will be described. A transducer input 50 receives the output from the ultrasonic transducer 28 from tool 48 via the electric cable 30. A conventional gain control element 52 is included within the control unit 22 for amplifying the output from the ultrasonic transducer 28. The output from the ultrasonic transducer 28 is then converted in an analog to digital converter 54 and is digitally combined 56 with a signal 58 from a gating control means 60 which controls extraneous early ultrasonic echo waves caused as the outgoing ultrasonic wave 40 exits sensor nozzle 24. A combined signal 62, with information both about the propagated ultrasonic wave 40 and the echo wave 42, then travels through a digital integrator 64 and an averaging module 66. The digitally integrated and averaged signal 68 is then sent to a logic control chip 70. The logic control chip 70 compares the digitally integrated and averaged signal 68 to a threshold expected signal value which is either set by an operator (not shown) or calculated by the logic control chip 70. The logic control chip 70 sends a signal through line 30 to generate a wave (right-hand side of FIG. 2), and thus chip 70 knows the time of propagation. Line 30 also provides the signal to input 50 of the receipt of the echo wave (left hand side of FIG. 2). Thus, chip 70 knows the time between propagation and receipt of the echo wave. The threshold expected signal value is equal to the expected digitally integrated and averaged signal which would be detected if the stream of fluid 32 is impinging upon the tool 18.

As would be understood by one skilled in the art, the threshold expected signal value can be easily calculated if the value of the distance between the ultrasonic transducer 28 and the tool 18 is known and if the velocity of the ultrasonic wave 40 in the stream of fluid 32 is known. These two values can be provided to the logic control chip 70 by one of a number of ways. First, the operator could input these values by means of a control pad 72, which could be designed to have a plurality of adjustable settings for known distances and known velocities in a set of fluids. An operator would select one of the settings. As one other example, during an initialization step an operator could send a series of test ultrasonic waves at a tool known to be present thereby establishing the threshold expected signal value. Once the expected value is set, if the digitally integrated and averaged signal 68 falls below the threshold expected signal value, the logic control chip 70 signals an alarm generator 74. This in turn generates an alarm signal 76 to either stop the tool 18 or to signal the operator.

Thus a tool detection system 10 is shown which provides for the simultaneous delivery of a stream of fluid 32 to a tool 18 and the continuous monitoring for the presence of that tool 18.

In a method for detecting the presence of the tool 18, a stream of fluid 32 is directed against the tool 18. An ultrasonic wave 40 is propagated in the stream of fluid 32. An echo wave 42 from ultrasonic wave 40 is reflected from the tool 18 in the stream of fluid 32. An alarm signal is generated in response to the absence of the echo wave 42 within predetermined limits.

If the tool 18 is not present then the time between propagating the ultrasonic wave 40 and detecting the echo wave 42 will increase and the actual digitally integrated and averaged signal 68 will decline below the threshold expected signal value. A narrow range on either side of the exact threshold expected signal value is set and when the actual digitally integrated and averaged signal 68 falls outside the range, a signal is sent by the logic control chip 70 to the alarm generator 74. The alarm generator 74 then either signals the operator with an alarm signal 76 or signals the tool drive unit 12 to stop the tool 18.

As will be appreciated by one skilled in the art, the method may include designing the control unit 22 to have a series of pre-set threshold expected signal values which could be selected by an operator to accommodate different distances between the sensor nozzle 24 and the tool 18. In addition, conventional gain controls and adjustable power levels could be used to accommodate differences in tool composition material and different tool sizes.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A tool detection system comprising:

a sensor nozzle for directing a stream of fluid to impinge against a tool;

a generator in said nozzle for propagating a signal wave in said stream of fluid;

a detector in said nozzle for detecting an echo wave of said signal wave reflected from the tool in said stream of fluid;

a timing module for timing an actual time period between propagation of said signal wave and detection of said echo wave; and an alarm generator responsive to said detector for generating an alarm signal in response to the absence of said echo wave within a predetermined time.

2. A tool detection system as defined in claim 1 wherein said timing module includes a calculator for calculating an expected time period between propagation of said ultrasonic wave and detection of said echo wave.

3. A tool detection system as recited in claim 1, wherein said signal wave is an ultrasonic wave.

4. A tool detection system as recited in claim 3 wherein said generator and said detector comprise a single transducer.

5. A tool detection system as recited in claim 3 further including a control unit electrically connected to said generator, said detector and said alarm generator.

6. A tool detection system comprising:

a wave generator in a fluid nozzle for propagating an ultrasonic wave in a stream of fluid directed at a tool;

a detector associated with said generator for detecting an echo wave of said ultrasonic wave reflected from said tool in the path of said ultrasonic wave; and a control for monitoring the time between said propagation of said wave, and receipt of said echo wave, and said control being operable to generate an alarm signal if said echo wave is not detected within a predetermined period of time.

7. A tool detection system as recited in claim 6, including means for sending a signal for stopping the tool in response to said alarm signal.

8. A method of detecting the presence of a tool comprising the steps of:

(a) positioning a tool adjacent a workpiece;

(b) impinging a stream of fluid against the tool;

(c) propagating a signal wave a first distance to the tool in the stream of fluid;

(d) detecting an echo wave of said signal wave reflected a second distance from the tool in the stream of fluid;

(e) generating an alarm signal in response to the absence of the echo wave within predetermined limits.

9. A method as recited in claim 8 further including the step of stopping movement of the tool in response to the alarm signal.

10. A method as recited in claim 8, wherein said signal wave is an ultrasonic wave.

11. A method as recited in claim 10 further including the step of establishing the predetermined limits by calculating the expected time of the travel of the ultrasonic wave over the first distance and the echo wave over the second distance.

12. A method as recited in claim 11 further including the step of measuring the actual time of the travel of the ultrasonic wave over the first distance and the echo wave over the second distance.

13. A method as recited in claim 12 further including the step of comparing the expected time to the actual time of the travel of the ultrasonic wave over the first distance and the echo wave over the second distance.

14. A method as recited in claim 13 further including the step of generating the alarm signal when the actual combined time of travel of the ultrasonic wave over the first distance and the echo wave over the second distance exceeds the expected time within the predetermined limits.

\* \* \* \* \*